United States Patent
Wang et al.

(10) Patent No.: US 10,209,993 B2
(45) Date of Patent: Feb. 19, 2019

(54) BRANCH PREDICTOR THAT USES MULTIPLE BYTE OFFSETS IN HASH OF INSTRUCTION BLOCK FETCH ADDRESS AND BRANCH PATTERN TO GENERATE CONDITIONAL BRANCH PREDICTOR INDEXES

(71) Applicant: VIA ALLIANCE SEMICONDUCTOR CO., LTD., Shanghai (CN)

(72) Inventors: Xiaoling Wang, Shanghai (CN); Mengchen Yang, Shanghai (CN); Guohua Chen, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 172 days.

(21) Appl. No.: 15/333,861

(22) Filed: Oct. 25, 2016

(65) Prior Publication Data
US 2018/0101385 A1   Apr. 12, 2018

(30) Foreign Application Priority Data
Oct. 10, 2016   (CN) .......................... 2016 1 0883034

(51) Int. Cl.
*G06F 9/38* (2018.01)
*G06F 12/0875* (2016.01)

(52) U.S. Cl.
CPC ........ *G06F 9/3806* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 5,954,816 | A | * | 9/1999 | Tran | G06F 9/3806 |
| | | | | | 712/233 |
| 6,073,230 | A | * | 6/2000 | Pickett | G06F 9/3806 |
| | | | | | 711/E12.018 |
| 2005/0228977 | A1 | * | 10/2005 | Cypher | G06F 9/3846 |
| | | | | | 712/240 |

(Continued)

*Primary Examiner* — Eric Coleman
(74) *Attorney, Agent, or Firm* — McClure, Qualey & Rodack, LLP (57) ABSTRACT

A branch predictor has a block address useable to access a block of instruction bytes of an instruction cache and first/second byte offsets within the block of instruction bytes. Hashing logic hashes a branch pattern and respective first/second address formed from the block address and the respective first/second byte offsets to generate respective first/second indexes. A conditional branch predictor receives the first/second indexes and in response provides respective first/second direction predictions of first/second conditional branch instructions in the block of instruction bytes. In one embodiment, a branch target address cache (BTAC) provides the byte offsets, and the first/second direction predictions are statically associated with first/second target addresses also provided by the BTAC. Alternatively, the byte offsets are predetermined values, and the first/second direction predictions are dynamically associated with the first/second target addresses based on the relative sizes of the byte offsets provided by the BTAC.

19 Claims, 5 Drawing Sheets

(56) References Cited

U.S. PATENT DOCUMENTS

| | | | |
|---|---|---|---|
| 2006/0218385 A1* | 9/2006 | Smith | G06F 9/3806 |
| | | | 712/238 |
| 2008/0209190 A1 | 8/2008 | Bhargava et al. | |
| 2009/0125707 A1* | 5/2009 | Olson | G06F 9/3806 |
| | | | 712/240 |
| 2009/0198984 A1* | 8/2009 | Loschke | G06F 9/3848 |
| | | | 712/240 |

* cited by examiner

BRANCH PREDICTOR THAT USES MULTIPLE BYTE OFFSETS IN HASH OF INSTRUCTION BLOCK FETCH ADDRESS AND BRANCH PATTERN TO GENERATE CONDITIONAL BRANCH PREDICTOR INDEXES

CROSS REFERENCE TO RELATED APPLICATION(S)

This application claims priority to China Application No. 201610883034.9, filed Oct. 10, 2016, which is hereby incorporated by reference in its entirety.

BACKGROUND

The need for increased prediction accuracy of branch instructions is well-known if the art of processor design. The need has grown even greater with the increase of processor pipeline lengths, cache memory latencies, and superscalar instruction issue widths. Branch instruction prediction involves predicting the target address and, in the case of a conditional branch instruction, the direction, i.e., taken or not taken.

Typically, instructions are fetched from an instruction cache in relatively large blocks, e.g., 16 bytes at a time. Consequently, multiple branch instructions may be present in the fetched block of instructions. There is a need to accurately predict the presence of the branch instructions in the fetched block and to predict both their target addresses and their directions. This is challenging because the location of the branch instructions within the block is relatively random. This is true with fixed-length instructions, but is particularly true with instruction set architectures that permit instructions to be variable length, e.g., x86 or ARM. For example, an x86 branch instruction may be located at any byte offset with the block of instruction bytes fetched from the instruction cache.

DETAILED DESCRIPTION OF THE EMBODIMENTS

Glossary

To hash two or more entities, such as an address and a branch pattern, means to perform one or more arithmetic and/or logical operations on one or more bits of each of the two or more entities to generate a result that has a smaller number of bits than the number of bits of the largest of the two or more entities. The one or more arithmetic and/or logical operations may include, but is not limited to: selection of predetermined bits of an entity; Boolean logical operations including exclusive-OR (XOR), NAND, AND, OR, NOT, rotate, shift; and arithmetic operations including addition, subtraction, multiplication, division, modulo. To illustrate by example, assume a 100-bit branch pattern, a 32-bit address, and a result that is a 10-bit index. To hash the address and the branch pattern may include XORing bits [9:0] and bits [19:10] of the branch pattern with bits [9:0] of the branch instruction address.

Embodiments are described of a branch predictor that potentially increases conditional branch prediction direction accuracy by hashing a more accurate representation of the address of conditional branch instructions than conventional branch predictors to generate indexes into a conditional branch predictor portion of the branch predictor.

Figure 1:
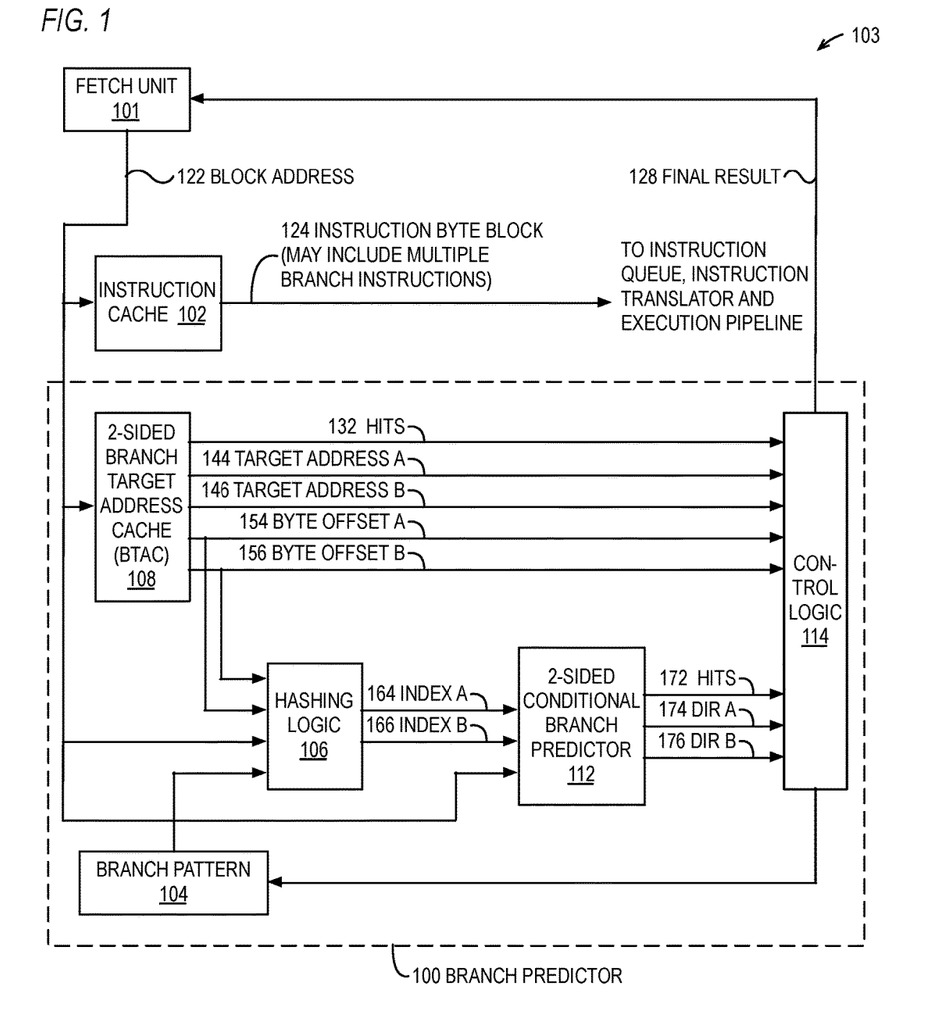
FIG. 1 is a block diagram illustrating a processor having a branch predictor.

Referring now to FIG. 1, a block diagram illustrating a processor 103 having a branch predictor 100 is shown. The processor 103 includes a fetch unit 101, an instruction cache 102, and the branch predictor 100, or branch prediction unit 100. The branch predictor 100 includes a branch pattern 104, hashing logic 106, a branch target address cache (BTAC) 108, a conditional branch predictor 112, and control logic 114.

The fetch unit 101 generates a block address 122 that is provided to the instruction cache 102, the BTAC 108, and the hashing logic 106. The instruction cache 102 provides a block of architectural instruction bytes 124 in response to the block address 122. In one embodiment, the instruction byte block 124 comprises 16 bytes, although other embodiments are contemplated. The instruction byte block 124 may include multiple architectural branch instructions, as discussed in more detail below. If the control logic 114 provides a target address 128, or final result 128, to the fetch unit 101, then the fetch unit 101 updates the block address 122 based on the target address 128 to fetch from a non-sequential program location, which is referred to as a redirection. Otherwise, i.e., absent a redirection to a target address 128, the fetch unit 101 increments the block address 122 after fetching an instruction byte block 124 from the instruction cache 102. The instruction byte block 124 is provided down the processor 103 pipeline.

Preferably, the instruction byte block 124 is received by an instruction queue (not shown). The instruction bytes are provided from the queue to an instruction translator (not shown) that translates the architectural instructions 124 into microinstructions that are provided to an execution pipeline (not shown) for execution. The queue buffers multiple blocks 124 worth of instruction bytes for provision to the instruction translator. As long as the queue has instructions for the instruction translator to translate and provide to the execution pipeline, the processor makes efficient utilization of the execution pipeline. Thus, a goal of the branch predictor 100 is to avoid the instruction queue getting so close to empty that the instruction translator does not have enough instructions to translate to keep the execution pipeline well utilized.

In one embodiment, the execution pipeline is a superscalar out-of-order execution pipeline that includes one or more architectural register files, a register renaming unit, a reorder buffer, reservation stations, a plurality of execution units, and an instruction scheduler for scheduling the issue of microinstructions to the execution units. The execution units may include one or more of the following execution unit types: integer unit, floating-point unit, media unit, single-instruction-multiple-data (SIMD) unit, branch execution unit, load unit, and store unit. Preferably, the processor 103 also includes a memory subsystem that includes a memory order buffer, translation-lookaside buffers, a tablewalk engine, a cache memory hierarchy, and various request queues, e.g., one or more load queues, store queues, fill queues, and/or snoop queues.

The BTAC 108 caches branch history information about previously executed branch instructions for the purpose of predicting the presence, direction and target address of branch instructions in the fetched instruction byte blocks 124. The BTAC 108 comprises one or more memory arrays of entries. Preferably, the one or more memory arrays are arranged as a set-associative cache with multiple ways that are arranged as sides, as described in more detail below. Each entry holds branch history information associated with a branch instruction. In one embodiment, each entry in the BTAC 108 includes the following fields: a valid bit, a tag, a branch type, a byte offset, a wrap bit, and a target address.

The direction of a branch instruction is whether the branch is taken or not taken. That is, if a branch instruction is not taken, then program flow proceeds sequentially, i.e., to the next instruction that follows the branch instruction in sequence at the address after the address of the not taken branch instruction. However, if a branch instruction is taken, then the branch instruction instructs the processor 103 to divert the program flow to a target address rather than to continue normal sequential program flow. In the case of unconditional branch instructions, such as call, return or unconditional jump instructions, the direction is always taken. In the case of conditional branch instructions, the direction is taken if a condition specified by the conditional branch instruction is met; otherwise, the direction of the conditional branch instruction is not taken. The condition is typically whether some architectural state of the processor, e.g., architectural condition flags, satisfy a criteria, e.g., greater than, less than, equal, negative, positive, carry, zero, overflow, etc.

The target address may be specified in various ways. In the case of a return instruction, the target address (or return address) is typically popped off a stack onto which the return address was previously pushed in response to a previously executed call instruction. Typically, the return address is the next sequential instruction after the call instruction. The target address may also be specified as a signed offset relative to the address of the branch instruction itself. The target address may also be held in an architectural register specified by the branch instruction, which is commonly referred to as an indirect branch instruction.

The valid bit indicates whether or not the entry is valid. When a branch instruction is executed by the execution pipeline and communicates relevant information about the executed branch instruction back to the branch predictor 100, the branch predictor 100 determines whether or not an entry for the branch instruction is already present in the BTAC 108. If not, the branch predictor 100 allocates an entry in the BTAC 108 for the branch instruction and sets the valid bit and populates the various fields of the allocated entry. In contrast, if an entry of the BTAC 108 predicts the presence of a branch instruction in an instruction byte block 124 and the execution pipeline determines that the branch instruction is no longer in the instruction byte block 124, the branch predictor 100 invalidates the entry. This could occur because the operating system loaded a new program into the memory locations corresponding to the instruction byte block 124, or self-modifying code was executed. Once a valid entry for a branch instruction exists in the BTAC 108, the BTAC 108 may continue to make predictions regarding the presence of the branch instruction in subsequently fetched instruction byte blocks 124 as well as make predictions of the direction and target address of the fetched branch instruction. However, as described in more detail below, frequently the conditional branch predictor 112, rather than the BTAC 108, is used to predict the direction of conditional branch instructions.

The tag field holds the upper bits of the address of the branch instruction. Lower bits of the block address 122 are used to index into the BTAC 108 to select a set of entries. Upper bits of the block address 122 are compared with the tags of the entries in the selected set. If a valid entry's tag matches the tag bits of the block address 122, then the BTAC 108 indicates a hit of the matching entry and provides the hitting branch instruction's predicted direction, target address and byte offset, as described in more detail below.

The branch type indicates the type of the branch instruction, such as call (e.g., x86 CALL instruction), return (e.g., x86 RET instruction), unconditional jump (e.g., x86 JMP instruction), and conditional jump (e.g., x86 Jcc instruction). In one embodiment, the entry also includes a bias bit and a force bias bit (not shown), which may be encoded in the branch type field. When the execution pipeline executes a branch instruction for the first time, the force bias bit is set and the bias bit is populated with the correctly resolved direction of first execution. On subsequent fetches of the instruction byte block 124 that includes the branch instruction, i.e., a hit in the entry that holds the branch instruction prediction information, if the force bias bit is set, then the BTAC 108 predicts the direction specified in the bias bit. The force bias bit is cleared the first time the bias bit incorrectly predicts the direction of the branch instruction. Preferably, each BTAC 108 entry also includes other fields used to make a direction prediction. In one embodiment, each entry includes a 2-bit saturating up-down counter that counts up each time a branch is taken and counts down each time a branch is not taken. If the upper bit of the counter is set, the BTAC 108 predicts the branch instruction is taken; otherwise, the BTAC 108 predicts not taken.

The byte offset specifies the location of the branch instruction within the instruction byte block 124. Preferably, the byte offset specifies the location of the first byte of the branch instruction within the instruction byte block 124. In one embodiment, the length of architectural instructions is variable, and specifically branch instructions may be of different lengths, e.g., as in the x86 instruction set architecture. In the case of a variable length instruction set architecture, a branch instruction may wrap around the instruction byte block 124 in which it begins such that it ends in the next sequential instruction byte block 124. In such as case the wrap bit is set of the entry of the branch instruction.

The control logic 114 uses the byte offset of hitting branch instructions to determine the first seen, taken branch instruction, if any, in an instruction byte block 124. "First" refers to first in program order. "Seen" refers to the fact that branch instructions that are located before the current architectural instruction pointer value are not seen. Thus, for example, if a redirection is taken to a branch target 128 that has a byte offset of 7 within the soon-to-be-fetched instruction byte block 124, then any branch instructions that the BTAC 108 predicts are present within the fetched instruction byte block 124 are not seen, i.e., even if they are predicted taken, they will not be considered because they do not appear in the new thread of instructions at the redirected address 128. As described in more detail below, the hashing logic 106 of the embodiment of FIG. 1 advantageously uses the byte offsets of branch instructions predicted by the BTAC 108 to generate more accurate indexes into the conditional branch predictor 112 to potentially improve the accuracy of the conditional branch predictor 112.

The target address is a prediction of the target address of the branch instruction based on its execution history. Preferably, when the execution pipeline executes a branch instruction, the branch predictor 100 updates the BTAC 108 entry of the branch instruction with the correctly resolved target address. In one embodiment, the branch predictor 100 also includes a call/return stack (not shown) for predicting return addresses of return instructions, and if the BTAC 108 indicates the branch type of the branch instruction is a return instruction, the control logic 114 selects the return address provided by the call/return stack rather than by the BTAC 108.

Preferably, the BTAC 108 is arranged as two "sides," referred to as side A and side B. For a given instruction byte block 124 fetched from the instruction cache 102, each side of the BTAC 108 provides at most only a single hitting target address/byte offset pair. This is because, for a given block of instruction bytes 124 fetched from the instruction cache 102, the logic that updates the BTAC 108 allows at most one entry in a side of the BTAC 108, i.e., the BTAC 108 update logic allows only a single branch instruction within the fetched block of instruction bytes to have an entry in each side. Hence, although a side of the BTAC 108 may have associativity, i.e., have multiple ways, the update logic allows only one way of the multiple ways of the side to have a valid entry for a branch instruction in the fetched instruction byte block 124. In one embodiment, the BTAC 108 has two sides, and each of the two sides has its own memory array with two ways. In an alternate embodiment, the BTAC 108 has a single memory array with four ways, and two of the ways are grouped into one side and the other two ways are grouped into the other side. Similarly, the conditional branch predictor 112 may also have associativity in its one or more memory arrays, and for a given block of instruction bytes 124 fetched from the instruction cache 102, the conditional branch predictor 112 provides at most only a single hitting direction prediction per side. This is because, for a given block of instruction bytes fetched from the instruction cache 102, the conditional branch predictor 112 update logic allows at most one entry in a side of the conditional branch predictor 112, i.e., the conditional branch predictor 112 update logic allows only a single branch instruction within the fetched block of instruction bytes to have an entry in each side.

In response to the block address 122, the BTAC 108 outputs hit indicators 132, a side A target address A 144 and a side B target address B 146 (referred to collectively as target addresses 144/146), and a side A byte offset A 154 and a side B byte offset B 156 (referred to collectively as byte offsets 154/156), all of which are provided to the control logic 114. Preferably, the hit indicators 132 indicate which of the ways in the BTAC 108 has a selected valid entry whose tag matches the tag portion of the block address 122. Although not shown, preferably the BTAC 108 also provides the control logic 114 with a direction prediction for each side. In the embodiment of FIG. 1, advantageously, the byte offsets 154/156 are also provided to the hashing logic 106.

The hashing logic 106 receives a branch pattern 104, also referred to as a branch path history 104, in addition to the block address 122 and the byte offsets 154/156. Assuming a branch pattern 104 of N bits, the branch pattern 104 is a global history of the direction of each of the last N branch instructions in program order. In one embodiment, a bit of the branch pattern 104 is set if the corresponding branch instruction was taken and clear if the branch instruction was not taken. In one embodiment, N is 100. As described below, the branch pattern 104 may be hashed with the address of a branch instruction (or an approximation thereof in the case of the embodiments describe with respect to FIGS. 3 and 4), to obtain an index into the conditional branch predictor 112 in order that incorporates not only the history of the branch instruction in question, but also the global history of other branch instructions around it in order to increase the accuracy of predicting the outcome of the branch instruction.

In one embodiment, the branch pattern 104 is updated with the correct direction each time a branch instruction is retired. In an alternate embodiment, the branch pattern 104 is updated with the predicted direction each time a branch instruction is predicted, even though the predicted direction may be speculative. The former embodiment has the advantage of being more accurate with respect to the fact that it only contains information for retired branch instructions and does not include information for branch instructions that have been merely predicted but which may never actually retire. The disadvantage of the former embodiment is that there may be on the order of tens of clock cycles between when an instance of branch instruction X is fetched from the instruction cache 102 and when the instance of branch instruction X retires; consequently, any predictions made for branch instructions fetched after the instance of branch instruction X is fetched and before the instance of branch instruction X is retired will not have the benefit of a global branch history that includes a direction for the instance of branch instruction X. In contrast, the latter embodiment has the advantage of making predictions for branch instructions using a global branch pattern 104 that includes all N previous branch instructions, although it has the disadvantage that some of the branch instructions included in the branch pattern 104 do not actually ever get retired.

The hashing logic 106 receives the block address 122, byte offsets 154/156, and branch pattern 104 and hashes them to generate a first index A 164 and a second index B 166. More specifically, preferably the hashing logic 106 concatenates the side A byte offset A 154 with the block address 122 to form the memory address of the first conditional branch instruction in the instruction byte block 124, and hashes the branch pattern 104 and the address of the first conditional branch instruction to generate the first index A 164; similarly, the hashing logic 106 concatenates the side B byte offset B 156 with the block address 122 to form the memory address of the second conditional branch instruction in the instruction byte block 124, and hashes the branch pattern 104 and the address of the second conditional branch instruction to generate the second index B 166. The indexes 164/166 are provided to the conditional branch predictor 112. Preferably, the hashing logic 106 comprises synthesized combinatorial logic. The hashing is described in more detail below after the description of the conditional branch predictor 112.

The conditional branch predictor 112 receives the indexes 154/156 from the hashing logic 106 and receives the block address 122 from the fetch unit 101 and, in response, generates hit indicators 172, a side A direction prediction A 174 and a side B direction prediction B 176. The conditional branch predictor 112 comprises at least one memory array that holds information for making a direction prediction of conditional branch instructions. In one embodiment, like the BTAC 108, the conditional branch predictor 112 is arranged as two sides, referred to as side A and side B. Preferably, each entry in the conditional branch predictor 112 includes a direction prediction bit. In one embodiment, the direction prediction bit is a most-significant bit of a saturating up-down counter (e.g., 3 bits) that is incremented each time the conditional branch instruction is taken and decremented each time the conditional branch instruction is not taken. In an alternate embodiment, the direction prediction bit is a most-significant bit of a value (e.g., 3 bits) that is updated according to a state machine based on whether or not the conditional branch predictor 112 correctly predicted the direction of the conditional branch instruction.

Preferably, the conditional branch predictor 112 memory array is a dual-ported memory array that includes two ports, one for side A and one for side B, that receive the respective side A/B indexes 164/166 and in response provide respective side A/B direction predictions 174/176. In one embodiment, each entry of the conditional branch predictor 112 includes a tag. The tag of each entry of the set of entries selected by an index 164/166 is compared with the tag portion of the block address 122 to determine whether a valid entry hit has occurred. In one embodiment, rather than simply being upper bits of the branch instruction address, each tag is a value generated by hashing bits of the branch history pattern with the upper bits of the branch instruction address. The direction prediction bit of the hitting entry from each side is provided as the respective direction prediction 174/176, which are provided to the control logic 114 along with the hit indicators 172.

In one embodiment, the conditional branch predictor 112 includes a plurality of memory arrays, also referred to as tables, which generate a corresponding plurality of direction predictions for each side, and only one of the plurality of direction predictions is chosen for each side as the direction prediction 174/176. In such embodiments, the hashing logic 106 generates multiple pairs of indexes 164/166 and provides them to the conditional branch predictor 112. For example, if the conditional branch predictor 112 has five tables, the hashing logic 106 provides five pairs of indexes 164/166 to the conditional branch predictor 112.

In one embodiment, the conditional branch predictor 112 is a tagged geometric length (TAGE) predictor. In the TAGE predictor embodiment, each of the plurality of tables is a single dual-ported static random access memory (SRAM). Additionally, each entry in the tables includes a tag compared to the tag portion of the block address 122. Furthermore, each table is indexed with its own distinct pair of indexes 164/166 generated by the hashing logic 106, and the indexes are generated using different lengths of the branch pattern 104. More specifically, a base table of the TAGE predictor is indexed with simply lower bits of the conditional branch instruction addresses formed by the concatenation of the block address 122 and the byte offsets 154/156, i.e., not hashed with the branch pattern 104. Whereas, the other tables receive their respective index pairs 164/166 from the hashing logic 106, and the index pair 164/166 for each table has been hashed using a different number of bits of the branch pattern 104 than the other tables. That is, the hashing logic 106, for each of the multiple tables, hashes the a different number of bits of the most recent bits of the branch pattern 104 with each conditional branch instruction address pair to generate the different index pairs 164/166 for the different tables. For example, assume the indexes 164/166 of each table are 10 bits and the branch pattern 104 is 100 bits. For a first of the tables, the hashing logic 106 performs a Boolean exclusive-OR (XOR) operation on bits [9:0] of the branch pattern 104 with bits [9:0] of the branch instruction address; for a second of the tables, the hashing logic 106 performs an XOR of bits [9:0] of the branch pattern 104 with bits [19:10] of the branch pattern 104 and with bits [9:0] of the branch instruction address; for a third of the tables, the hashing logic 106 performs an XOR of bits [9:0] of the branch pattern 104 with bits [19:10] of the branch pattern 104 and with bits [29:20] of the branch pattern 104 and with bits [39:30] of the branch pattern 104 and with bits [9:0] of the branch instruction address; and so forth. This embodiment is described for exemplary purposes, and other embodiments are contemplated in which the hashing logic 106 uses different sets of bits of the branch pattern and/or the branch instruction address and performs other arithmetic and/or logical operations than XOR.

The control logic 114 takes the BTAC hit indicators 132, target addresses 154/156, the byte offsets 154/156, the conditional branch predictor hit indicators 172, and the direction predictions 174/176, and determines the first in program order, valid, seen, taken branch instruction, if any, in the instruction byte block 124. If such a branch instruction is found, the control logic 114 signals the fetch unit 101 to redirect program flow to the final result 128 generated by the control logic 114; otherwise, the fetch unit 101 fetches an instruction byte block 124 from the next sequential block address 122.

Figure 2:
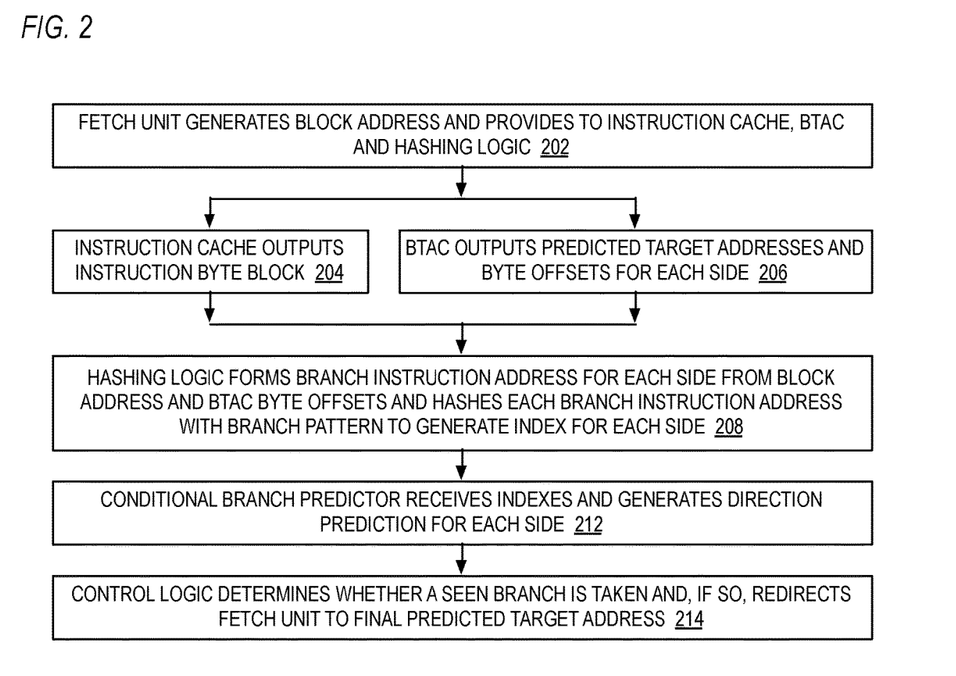
FIG. 2 is a flowchart illustrating operation of the branch predictor of FIG. 1.

Referring now to FIG. 2, a flowchart illustrating operation of the branch predictor 100 of FIG. 1 is shown. FIG. 2 is intended to illustrate the passage of time in a downward fashion, and the actions performed in blocks horizontally parallel to one another occur substantially in parallel with one another. Flow begins at block 202.

At block 202, the fetch unit 101 generates a block address 122 and provides it to the instruction cache 102, BTAC 108 and hashing logic 106 of FIG. 1. Flow proceeds to blocks 204 and 206 in parallel.

At block 204, the instruction cache 102 outputs an instruction byte block 124. In one embodiment, the instruction cache 102 has a latency of 3 clock cycles from the time the block address 122 is asserted until the instruction cache 102 provides the instruction byte block 124, although other embodiments are contemplated. Flow proceeds to block 208.

At block 206, the BTAC 108 outputs the predicted target addresses 144/146, byte offsets 154/156, and hits 132 for each side, i.e., for side A and side B. In one embodiment, the BTAC 108 also has a latency of 3 clock cycles from the time the block address 122 is asserted until the BTAC 108 provides its outputs, although other embodiments are contemplated. Flow proceeds to block 208.

At block 208, the hashing logic 106 hashes each of the two branch instruction addresses formed from the block address 122 and the byte offsets 154/156 with the branch pattern 104 to generate the indexes 164/166 of side A and side B. Flow proceeds to block 212.

At block 212, the conditional branch predictor 112 receives the indexes 164/166 and in response generates the direction predictions 174/176 for side A and side B and the hits 172. Flow proceeds to block 214.

At block 214, the control logic 114 determines from its inputs whether the BTAC 108 and conditional branch predictor 112 together predict that a valid, seen, taken branch instruction is present in the instruction byte block 124. If so, the control logic 114 outputs on the final result 128 to the fetch unit 101 the target address 144/146 of the side that has the first, valid, seen, taken branch instruction to redirect flow of the program to the selected target address 144/146. Flow ends at block 214.

Figure 3:
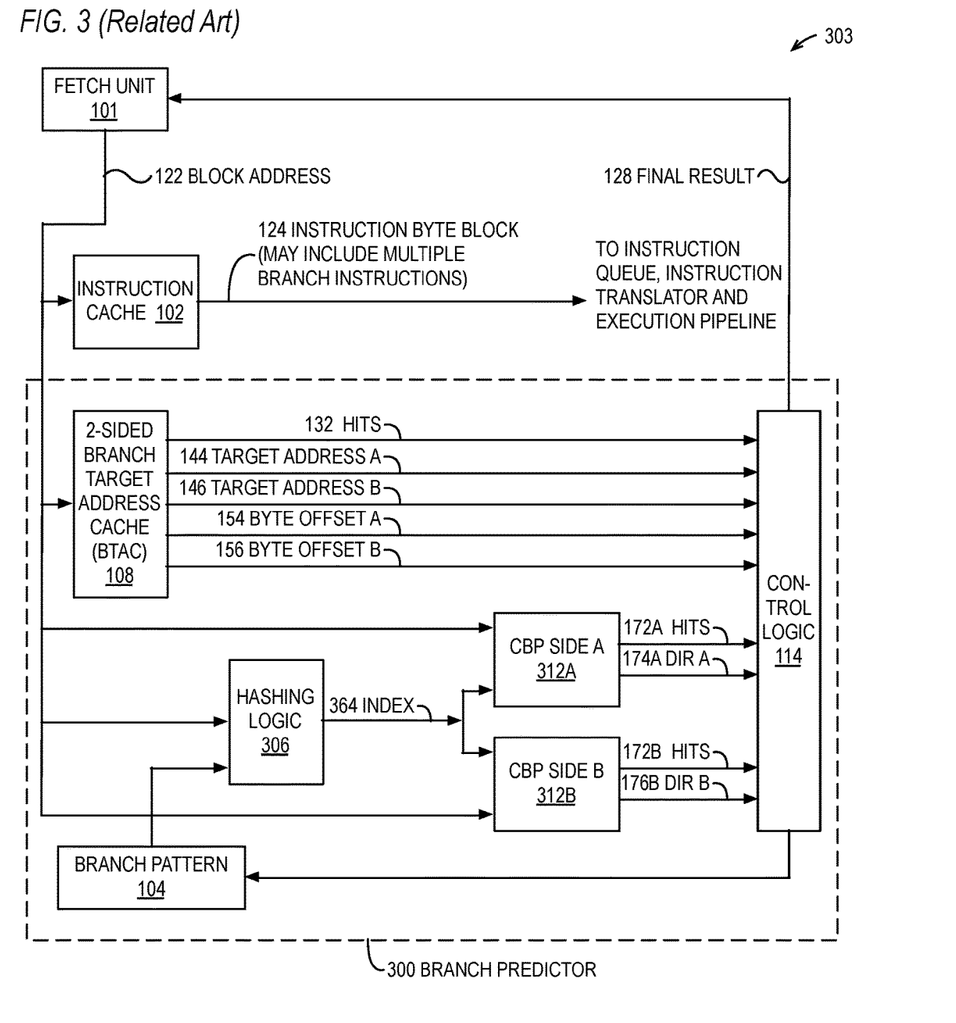
FIG. 3 is a block diagram illustrating a processor having a conventional branch predictor.

In order to appreciate the advantages of the branch predictor 100 of FIG. 1, a conventional branch predictor 300 will now be described with respect to FIG. 3. The conventional branch predictor 300 of FIG. 3 is similar in many ways to the branch predictor 100 of FIG. 1. However, the hashing logic 306 of FIG. 3 does not receive the byte offsets 154/156 from the BTAC 108 and does not use them to form an address of each conditional branch instruction. Rather, the hashing logic 306 of FIG. 3 hashes the block address 122 with the branch pattern 104 to generate a single index 364 that is provided to both of two separate conditional branch predictors 312A and 312B of respective sides A and B. More specifically, each side has a separate memory array, and the conventional branch predictor 300 updates the side A conditional branch predictor 112A upon execution of a conditional branch instruction whose prediction information resides in side A of the BTAC 108, and updates the side B conditional branch predictor 112B upon execution of a conditional branch instruction whose prediction information resides in side B of the BTAC 108.

As may be observed, the branch predictor 100 of FIG. 1 has the potential advantage that the indexes 164/166 generated by its hashing logic 106 may be more accurate than the index 364 generated by the conventional hashing logic 306 since the conventional hashing logic 306 only hashes using the block address 122, whereas the hashing logic 106 of the embodiment of FIG. 1 hashes using the precise address of each of the conditional branch instructions since it has the benefit of using the byte offsets 154/156 of the conditional branch instructions, as described above.

As may be further observed, the branch predictor 100 of FIG. 1 has the potential advantage of each of the indexes 164/166 being able to lookup direction prediction information in a larger memory array than the conventional branch predictor 300. That is, assuming the same number of entries, N, in the single array 112 of FIG. 1 as the combined number of entries in the two arrays 312A and 312B of FIG. 3, and given that the two arrays 312A and 312B of FIG. 3 are updated separately and therefore contain different information, the two indexes 164/166 of the embodiment of FIG. 1 each get to search all N entries, whereas the conventional branch predictor 300 has a single index 364 to search each half of the N entries of the two arrays 312A and 312B of FIG. 3. It should be understood that this potential advantage may be obtained as a tradeoff for the fact that the single array 112 of the embodiment of FIG. 1 might be larger since it is dual-ported whereas each of the two arrays 312A and 312B of FIG. 3 may be single-ported.

As described above, the branch predictor 100 has latency, i.e., it may require multiple clock cycles after receiving the block address 122 and branch pattern 104 to redirect the fetch unit 101 to the final predicted target address 128. Assume the latency of the branch predictor 100 is N clock cycles. In one embodiment, when the fetch unit 101 is redirected, the fetch unit 101 initiates a fetch of the instruction byte block 124 at the target address 128 and for the next N−1 clock cycles initiates sequential fetches while the branch predictor 100 is generating a prediction for the instruction byte block 124 fetched at the redirected target address 128. That is, the fetch unit 101 assumes no taken branches. If after the N clock cycles the branch predictor 100 redirects, which indicates the assumption was incorrect, then the N−1 instruction byte blocks 124 that were sequentially incorrectly fetched are invalidated, i.e., effectively removed from the instruction queue, which may result in the queue not providing sufficient instructions to the instruction translator to keep the execution pipeline well utilized.

Thus, it should additionally be understood that the potential advantages of the embodiment of FIG. 1 might be obtained as a tradeoff for the fact that in some implementations the latency of the BTAC 108 and hashing logic 106 may be sufficiently large that the branch predictor 100 requires an additional clock cycle over the conventional branch predictor 300, which may have the consequence of more frequently keeping the queue less full. However, whether a particular implementation incurs this tradeoff is dependent upon the process technology, clock cycle periods, and logic gate path lengths.

An embodiment will now be described which has the potential advantages that it may increase the accuracy of conditional branch instruction direction prediction by generating two separate indexes using two distinct branch instruction addresses, as does the embodiment of FIG. 1, yet does not incur the delay associated with waiting for the BTAC 108 to generate the byte offsets 154/156 in order to perform the hashing to generate the indexes 164/166 and is therefore less likely to increase the overall latency of the branch predictor 100. It should be understood that the second advantage may be obtained potentially at the cost of less accuracy than the embodiment of FIG. 1 due to less accuracy of the two formed conditional branch instruction addresses that are hashed with the branch pattern 104, as described in more detail below.

Figure 4:
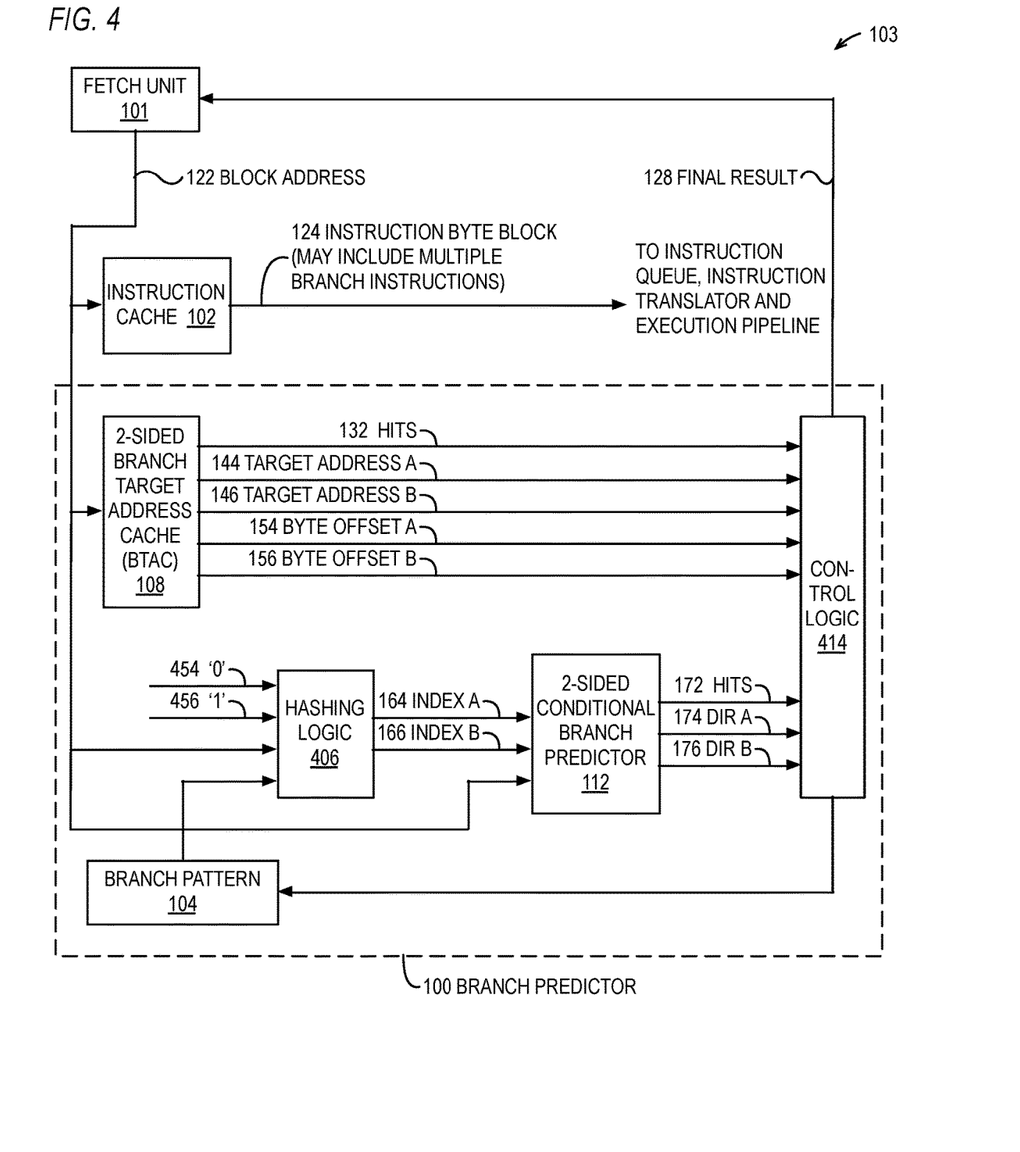
FIG. 4 is a block diagram illustrating a processor having a branch predictor according to an alternate embodiment.

Referring now to FIG. 4, a block diagram illustrating a processor 103 having a branch predictor 100 according to an alternate embodiment is shown. The embodiment of FIG. 4 is similar in many respects to the embodiment of FIG. 1. However, the hashing logic 406 of FIG. 4, rather than receiving the byte offsets 154/156 from the BTAC 108, receives two predetermined values used to form two distinct branch instruction addresses that are hashed with the branch pattern 104 to generate the side A index A 164 and the side B index B 166 provided to the conditional branch predictor 112. In the embodiment shown in FIG. 4, the two predetermined values are zero ("0") 454 and one ("1") 456. Preferably, the hashing logic 106 forms a first branch instruction address by concatenating the zero value 454 with the block address 122 and forms a second branch instruction address by concatenating the one value 456 with the block address 122 and hashes each of these two addresses with the branch pattern 104 to generate the indexes 164/166. Preferably, the hashing logic 106 performs the two hashes in a manner similar to those described with respect to FIG. 1, although other hashing embodiments are contemplated.

Another difference between the embodiments of FIG. 1 and FIG. 4 is that, unlike the embodiment of FIG. 1 in which the control logic 114 associates direction A 174 with target address A 144 and byte offset A 154 and associates direction B 176 with target address B 146 and byte offset B 156, the control logic 414 of the embodiment of FIG. 4 associates direction A 174 with the side of the two target addresses 144/146 having the smallest of the two byte offsets 154/156 and associates direction B 146 with the side of the two target addresses 144/146 having the largest of the two byte offsets 154/156.

Yet another difference between the embodiments of FIG. 1 and FIG. 4 is that, unlike the embodiment of FIG. 1 in which the actual address of the conditional branch instruction is used to update the conditional branch predictor 112, the embodiment of FIG. 4 Also retains the indexes 164/166 computed by the hashing logic 106 and uses the appropriate one of them to update the conditional branch predictor 112 after a conditional branch instruction has been executed.

Figure 5:
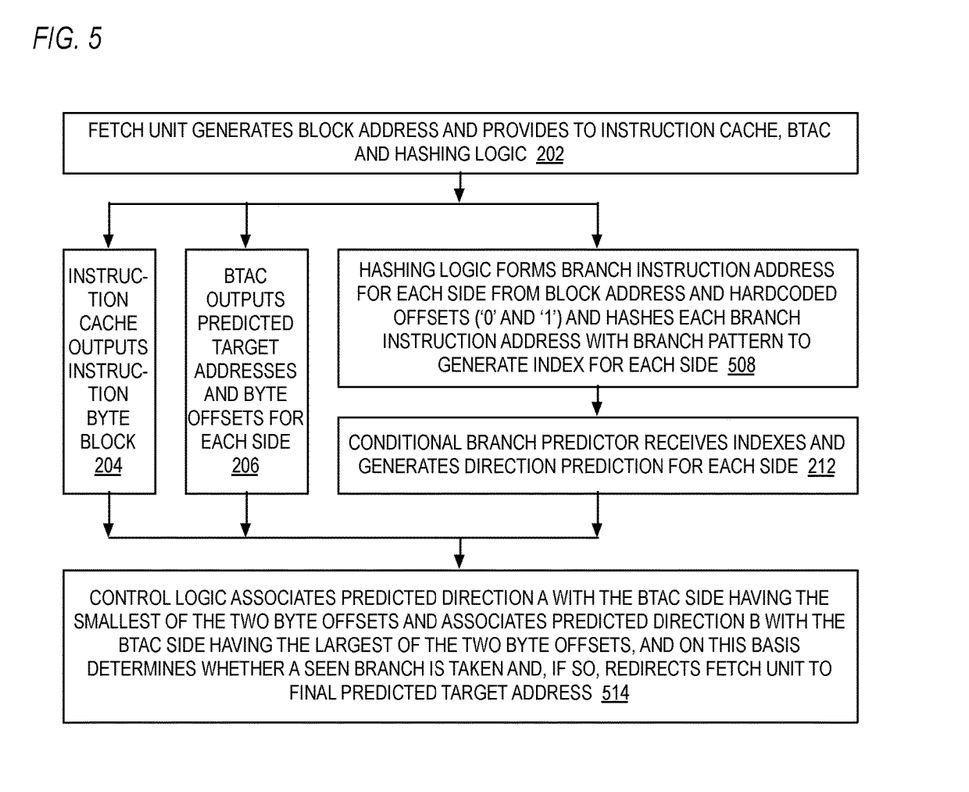
FIG. 5 is a flowchart illustrating operation of the branch predictor of FIG. 4.

Referring now to FIG. 5, a flowchart illustrating operation of the branch predictor 100 of FIG. 4 is shown. Like FIG. 2, FIG. 5 is intended to illustrate the passage of time in a downward fashion, and the actions performed in blocks horizontally parallel to one another occur substantially in parallel with one another. Flow begins at block 202.

At block 202, the fetch unit 101 generates a block address 122 and provides it to the instruction cache 102, BTAC 108 and hashing logic 406 of FIG. 4. Flow proceeds to blocks 204, 206 and 508 in parallel.

At block 204, the instruction cache 102 outputs an instruction byte block 124. Flow proceeds to block 514.

At block 206, the BTAC 108 outputs the predicted target addresses 144/146, byte offsets 154/156, and hits 132 for each side, i.e., for side A and side B. Flow proceeds to block 514.

At block 508, the hashing logic 406 hashes each of the two branch instruction addresses formed from the block address 122 and the zero value 454 and the one value 456 with the branch pattern 104 to generate the indexes 164/166 of side A and side B. Flow proceeds to block 212.

At block 212, the conditional branch predictor 112 receives the indexes 164/166 and in response generates the direction predictions 174/176 for side A and side B and the hits 172. Flow proceeds to block 514.

At block 514, the control logic 414 examines the byte offsets 154/156 to determine which one is smaller and which one is larger. The control logic 414 associates direction prediction A 174 with the target address 154/156 whose side of the BTAC 108 has the smaller of the two byte offsets 154/156 and associates direction prediction B 176 with the target address 154/156 whose side of the BTAC 108 has the larger of the two byte offsets 154/156. On this basis, the control logic 414 determines whether the BTAC 108 and conditional branch predictor 112 together predict that a valid, seen, taken branch instruction is present in the instruction byte block 124. If so, the control logic 414 outputs on the final result 128 to the fetch unit 101 the target address 144/146 of the side that has the first, valid, seen, taken branch instruction to redirect flow of the program to the selected target address 144/146. Flow ends at block 514.

A potential advantage of the embodiment of FIG. 4 is that the conditional branch predictor 112 produces the directions 174/176 (and hits 172) in the same clock cycle as the BTAC 108 produces its outputs because it does not use the byte offsets 154/156 generated by the BTAC 108 and therefore does not have to wait for the BTAC 108 to produce them. Consequently, in some implementations, the branch predictor 100 of FIG. 4 is able to make its final prediction 128 a clock cycle earlier than the branch predictor 100 of FIG. 1. This advantage is appreciated at the disadvantage of potentially less branch prediction accuracy due to less precision of the branch instruction addresses hashed by the hashing logic 406, since the branch instruction addresses are formed using the constant zero and one values rather than the actual byte offsets 154/156 provided by the BTAC 108.

Additionally, the advantage is appreciated at a potential disadvantage when a new branch instruction is allocated into the BTAC 108. This is due to the fact that the control logic 414 of the embodiment of FIG. 4 associates the directions 174/176 with the target addresses 144/146 based on the relative sizes of their associated byte offsets 154/156, as described above. More specifically, the new branch instruction may have a byte offset that is different from the byte offset of the branch instruction that it replaced. Consequently, relative to the remaining byte offset in the other side of the BTAC 108, there may be a change in the relative locations of the two branch instructions within the instruction byte block 124 (i.e., change from smaller to bigger offset or vice versa) such that the branch predictor 100 may be using wrong prediction information for a few instances of the two branch instructions until the branch history information is updated.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A branch predictor, comprising:
    a block address useable to access a block of instruction bytes of an instruction cache of a processor;
    a first byte offset within the block of instruction bytes;
    a second byte offset within the block of instruction bytes;
    hashing logic that hashes a branch pattern and a first address formed from the block address and the first byte offset to generate a first index and that hashes the branch pattern and a second address formed from the block address and the second byte offset to generate a second index;
    a conditional branch predictor that receives the first and second indexes and in response provides respective first and second direction predictions of first and second conditional branch instructions in the block of instruction bytes; and
    a branch target address cache (BTAC) that provides the first and second byte offsets to the hashing logic in response to the block address.

2. The branch predictor of claim 1, further comprising:
    wherein the BTAC, in response to the block address, also provides first and second branch target address predictions corresponding to the first and second byte offsets; and
    wherein the branch predictor statically associates the first direction prediction provided by the conditional branch predictor with the first branch target address prediction provided by the BTAC and statically associates the second direction prediction provided by the conditional branch predictor with the second branch target address prediction provided by the BTAC.

3. The branch predictor of claim 1, further comprising:
wherein the first and second byte offsets each are N bits, wherein N is $\log_2 2Q$, wherein Q is a number of instruction bytes in the block of instruction bytes provided by the instruction cache in response to the block address.

4. The branch predictor of claim 1, further comprising:
wherein the conditional branch predictor is updated using a correctly resolved address of a conditional branch instruction executed by the processor.

5. The branch predictor of claim 1, further comprising:
wherein the first byte offset has a first predetermined value and the second byte offset has a second predetermined value, wherein the first and second predetermined values are different.

6. The branch predictor of claim 1, further comprising:
in response to the block address, the BTAC provides a branch target address prediction and a corresponding byte offset for each of the first and second conditional branch instructions;
wherein the branch predictor determines which of the byte offsets provided by the BTAC has a smaller value and which has a larger value; and
wherein the branch predictor dynamically associates the first direction prediction provided by the conditional branch predictor with the branch target address prediction whose corresponding byte offset provided by the BTAC has the smaller value and dynamically associates the second direction prediction provided by the conditional branch predictor with the branch target address prediction whose corresponding byte offset provided by the BTAC has the larger value.

7. The branch predictor of claim 6, further comprising:
wherein the BTAC is accessed by the block address and the conditional branch predictor is accessed by the first and second indexes within a same clock cycle.

8. The branch predictor of claim 5, further comprising:
wherein the conditional branch predictor is updated using one of the first and second indexes generated by the hashing logic.

9. The branch predictor of claim 1, further comprising:
wherein the conditional branch predictor comprises a memory having first and second ports that respectively receive the first and second indexes and respectively provide the first and second direction predictions.

10. The branch predictor of claim 9, further comprising:
wherein the conditional branch predictor comprises a plurality of memories, wherein each memory of the plurality of memories has first and second ports that receive a respective pair of first and second indexes and provide respective first and second direction predictions; and
wherein the hashing logic hashes a different length of the branch pattern and the first/second address formed from the block address and the first/second byte offset to generate the first/second indexes for each of the plurality of memories.

11. The branch predictor of claim 1, further comprising:
wherein the hashing logic comprises combinatorial logic that receives the block address, the branch pattern, the first offset and the second offset and in response generates the first and second indexes.

12. A method for operating a branch predictor, the method comprising:
using a block address to access a block of instruction bytes of an instruction cache of a processor;
providing first and second byte offsets within the block of instruction bytes;
hashing a branch pattern and a first address formed from the block address and the first byte offset to generate a first index and hashing the branch pattern and a second address formed from the block address and the second byte offset to generate a second index;
providing, by a conditional branch predictor, respective first and second direction predictions of first and second conditional branch instructions in the block of instruction bytes in response to receiving the first and second indexes; and
providing, by a branch target address cache (BTAC), the first and second byte offsets in response to the block address.

13. The method of claim 12, further comprising:
providing, also by the BTAC in response to the block address, first and second branch target address predictions corresponding to the first and second byte offsets; and
statically associating the first direction prediction provided by the conditional branch predictor with the first branch target address prediction provided by the BTAC and statically associating the second direction prediction provided by the conditional branch predictor with the second branch target address prediction provided by the BTAC.

14. The method of claim 12, further comprising:
updating the conditional branch predictor using a correctly resolved address of a conditional branch instruction executed by the processor.

15. The method of claim 12, further comprising:
wherein the first byte offset has a first predetermined value and the second byte offset has a second predetermined value, wherein the first and second predetermined values are different.

16. The method of claim 12, further comprising:
providing, by the BTAC in response to the block address, a branch target address prediction and a corresponding byte offset for each of the first and second conditional branch instructions;
determining which of the byte offsets provided by the BTAC has a smaller value and which has a larger value; and
dynamically associating the first direction prediction provided by the conditional branch predictor with the branch target address prediction whose corresponding byte offset provided by the BTAC has the smaller value and dynamically associating the second direction prediction provided by the conditional branch predictor with the branch target address prediction whose corresponding byte offset provided by the BTAC has the larger value.

17. The method of claim 12, further comprising:
updating the conditional branch predictor using one of the first and second indexes generated by the hashing logic.

18. The method of claim 12, further comprising:
wherein the conditional branch predictor comprises a memory having first and second ports that respectively receive the first and second indexes and respectively provide the first and second direction predictions.

19. A computer program product encoded in at least one non-transitory computer usable medium for use with a computing device, the computer program product comprising:

computer usable program code embodied in said medium, for specifying a branch predictor, the computer usable program code comprising:
  first program code for specifying a block address useable to access a block of instruction bytes of an instruction cache of a processor;
  second program code for specifying a first byte offset within the block of instruction bytes;
  third program code for specifying a second byte offset within the block of instruction bytes;
  fourth program code for specifying hashing logic that hashes a branch pattern and a first address formed from the block address and the first byte offset to generate a first index and that hashes the branch pattern and a second address formed from the block address and the second byte offset to generate a second index; and
  fifth program code for specifying a conditional branch predictor that receives the first and second indexes and in response provides respective first and second direction predictions of first and second conditional branch instructions in the block of instruction bytes;
  wherein a branch target address cache (BTAC) provides the first and second byte offsets to the hashing logic in response to the block address.

* * * * *